(12) United States Patent
Maximus

(10) Patent No.: US 6,830,339 B2
(45) Date of Patent: Dec. 14, 2004

(54) POLARIZED LIGHT RECUPERATION APPARATUS

(75) Inventor: Bart Maximus, Oudenaarde (BE)

(73) Assignee: Barco N.V., Kortrijk (BE)

( * ) Notice: Subject to any disclaimer, the term of this patent is extended or adjusted under 35 U.S.C. 154(b) by 0 days.

(21) Appl. No.: 10/191,358

(22) Filed: Jul. 8, 2002

(65) Prior Publication Data

US 2003/0007130 A1 Jan. 9, 2003

(30) Foreign Application Priority Data

Jul. 6, 2001 (GB) .............................................. 0116446

(51) Int. Cl.⁷ ........................ G03B 21/14; G03B 21/26; G02F 1/1335; G02F 27/28; G02F 5/30
(52) U.S. Cl. .............................. 353/20; 353/37; 349/9; 362/19; 359/487; 359/495
(58) Field of Search .............................. 353/20, 30, 31, 353/33, 34, 37; 349/9, 65, 48; 362/19, 263, 293, 298, 26, 311; 359/487, 49, 41, 48, 443, 445, 483, 485

(56) References Cited

U.S. PATENT DOCUMENTS

| | | |
|---|---|---|
| 5,808,709 A | 9/1998 | Davis |
| 5,833,360 A | 11/1998 | Knox |
| 6,064,523 A | 5/2000 | Budd et al. |
| 6,243,149 B1 * | 6/2001 | Swanson et al. .............. 349/62 |
| 6,587,269 B2 * | 7/2003 | Li .............................. 359/497 |
| 2003/0063261 A1 * | 4/2003 | Li .............................. 353/20 |

FOREIGN PATENT DOCUMENTS

EP 0552725 A1 7/1993

* cited by examiner

Primary Examiner—David Gray
Assistant Examiner—Rochelle Blackman
(74) Attorney, Agent, or Firm—Barnes & Thornburg

(57) ABSTRACT

The present invention provides a method and a device for optical polarization recuperation for producing a substantially polarized light beam from an unpolarized light beam comprising first and second polarizations.

The device according to the invention comprises:

an optical circuit having an entrance side with an aperture for receiving incoming light rays, and an exit area for allowing light rays to exit the optical circuit, the light rays following a first light path between the aperture and the exit area, a reflective polarizer means adjacent the exit area of the optical circuit, for transmitting light rays having the first polarization and for reflecting back into the optical circuit light rays which have the second polarization, the light rays having the second polarization following a second light path in the optical circuit, a mirror with a hole in it at the entrance side of the optical circuit, for reflecting those light rays following the second light path which fall onto it, the hole forming at least the aperture, and a quarter wave or an odd multiple of quarter wave retarder means through which at least a part of the light emitted from the optical circuit passes.

18 Claims, 3 Drawing Sheets

POLARIZED LIGHT RECUPERATION APPARATUS

TECHNICAL FIELD OF THE INVENTION

The present invention relates to the field of sources of polarized light as well as methods of providing polarized light, more particularly for the polarization of light for use e.g. in light valve devices such as for example LCD or LCOS projectors.

BACKGROUND OF THE INVENTION

A liquid crystal device (LCD) or liquid crystal on semiconductor (LCOS) device may be used in various applications, such as for example displays (e.g. displays in laptop computers, watches and calculators) and projection systems for projecting information or images onto a distant screen.

An LCD or LCOS projector basically comprises a lamp for generating light, illumination optics for capturing that light and transferring it to one or a plurality of LCD or LCOS devices comprising light valves, and a projection lens which images the illuminated LCD or LCOS device(s) on a screen. A basic property of both LCD and LCOS devices is that they work with polarized light, more particularly with linearly polarized light. Polarized light is used together with the properties of the liquid crystal elements to selectively transmit/reflect or absorb light to produce a pattern of light and dark pixels, thus creating a desired image. Because almost all lamps used in projectors generate non-polarized light, which is light comprising at least two polarization directions, this light has to be polarized in an optical system either before it reaches the LCD or LCOS device(s) or in the device itself. This may be done by only selecting that part of the light which has a desired polarization direction, e.g. using a polarising filter, which method, however, leads to a loss of light output for the projector.

To overcome this problem, typical LCD or LCOS projectors use a polarization recuperation system that splits the unpolarized light from the lamp into two light beams which each have one of the two independent polarization directions. Each light beam with a different polarization direction follows a different optical path. The two independently polarized states for example can be two orthogonal linear polarizations or as another example a left and right circular polarization. The light with one of the two polarization directions is then converted into the other polarization state by a retarder or a polarization rotator. Thereafter it is cast on the LCD or LCOS devices via another optical path. This system avoids throwing away the light having the unwanted polarization state and therefore almost doubles the efficiency of the illumination optics.

One prior art embodiment of such a polarization recuperation system is a lightpipe combined with a polarising beam splitter (PBS) system that is introduced in the optical path, as explained in U.S. Pat. No. 5,884,991. Light from the lamp is sent into the entrance of the lightpipe by using a reflector and possibly also some extra condensor lens or lenses. Inside the lightpipe the light is reflected a number of times on the side surfaces, and is homogenised when it reaches the end of the lightpipe. Essentially the exit of the lightpipe is imaged onto the LCD or LCOS devices by a set of lenses. The lightpipe is used to make the illumination of the LCD or LCOS device(s) more uniform. A PBS is provided in the optical path, after the lightpipe. A PBS is an optical element designed to split light into two linearly orthogonal polarization directions, the s and p polarizations. Light with one polarization direction is reflected by the PBS, light with the other polarization direction is transmitted. According to the embodiment described in U.S. Pat. No. 5,884,991, on one of the two exit faces of the PBS a half wave retarder is provided, which converts light with one linear polarization direction into light with the other linear polarization direction.

According to another embodiment of a prior art polarization recuperation system, as described in WO 02/17000, the polarization recovery system is built in a lightpipe. The lightpipe obtained is highly complex and has more than 6 surfaces. This complicates the manufacturing of the lightpipe and the alignment in the projector, and has a negative effect on the homogenising property of the lightpipe.

Furthermore, it is a disadvantage of both prior art solutions described that the finally formed polarized light beam occupies an area which is larger than the area occupied by the original light beam, which means that less light intensity reaches every light valve of the LCD or LCOS device illuminated by means of the lightpipe or that additional optical components are required to focus the beam onto a smaller area.

SUMMARY OF THE INVENTION

It is an object of the present invention to make effective use of the light available in an optical system and method, while using a light polarizer in the optical system.

It is a further object of the present invention to provide an optical system and method which produces a concentrate beam of polarized light having a beam diameter comparable with that of input light to the system.

The above objective is accomplished by a device and a method according to the present invention.

The present invention provides an optical polarization recuperation device for producing a substantially polarized light beam from an unpolarized light beam comprising first and second polarizations, the device comprising:

an optical circuit having an entrance area for receiving incoming light rays, and an exit area for allowing light rays to exit the optical circuit, a reflective polarizer means adjacent the exit area of the optical circuit, for directing light rays having the first polarization into a first light path and for directing light rays which have the second polarization into a second light path in the optical circuit, a mirror at the entrance area of the optical circuit, with a means for reflecting those light rays following the second light path which fall onto it, and a quarter wave or an odd multiple of quarter wave retarder means through which at least a part of the light in the optical circuit and which is to be emitted from the optical circuit passes, wherein light following the first and the second light path goes through the same part of the optical circuit.

According to the present invention, the first and the second light path go through the same part of the optical circuit.

The optical circuit may be a lightpipe.

According to an embodiment of the present invention, the retarder means is provided in both the first and second light path.

According to an embodiment of the present invention, the retarder means may be placed at the exit area of the optical circuit. According to another embodiment, the retarder means may be placed at the entrance side of the optical circuit.

The retarder means may be a quarter wavelength or an odd multiple of a quarter wave retarder or a number of retarders which co-operate together to form a quarter wave or an odd multiple of a quarter wave retarder. For example, the retarder means may be formed from two eighth wavelength retarders.

The retarder means may be a broadband retarder.

According to an embodiment of the present invention, the reflective polarizer means may be a polarising beam splitter. According to another embodiment of the present invention, the reflective polarizer means may be a wiregrid polarizer.

An optical polarization recuperation system device to the present invention may furthermore comprise a depolarizer means for depolarising light. When the light rays are emitted from a light source having electrodes, the depolarizer means may comprise plasma between the electrodes of the light source. A depolarizer means may be located anywhere else in the second light path as well.

The present invention also provides optical polarization recuperation device for producing a substantially polarized light beam from an unpolarized light beam comprising first and second polarizations, the device comprising:

an optical circuit having an entrance area for receiving incoming light rays, and an exit area for allowing light rays to exit the optical circuit, a reflective polarizer means at the exit area of the optical circuit, for directing light rays having the first polarization along a first light path and for directing into the optical circuit light rays which have the second polarization, the light rays having the second polarization following a second light path in the optical circuit, a mirror at the entrance area of the optical circuit having means for reflecting those light rays following the second light path which fall onto it, and a depolarizer means for depolarizing light, the depolarizing means being at least in the second light path.

The depolarizer means may comprise a birefringent material in the cross-section of the light pipe, more specifically in case the optical circuit is a lightpipe, the depolarizer means may comprise a birefringent material on any inner surface of the lightpipe.

When the light rays are emitted from a light source having electrodes, the depolarizer means may comprise a plasma between the electrodes of the light source.

The optical circuit may be a light pipe. For example the lightpipe may be a hollow structure with internally mirrored surfaces. Alternatively, the lightpipe may be a solid rod in which reflections to the side surfaces are based on internal reflection of light with a large incident angle, such as a glass rod for example. The lightpipe may have a constant cross-section or it may be tapered towards the exit area.

The reflective polarizer means comprises a cholesteric liquid polarizer.

The present invention furthermore comprises a method for recuperating polarized light said method comprising the steps of:

providing a beam of unpolarized light rays comprising first and second polarizations, the beam of unpolarized light rays following a first light path, impinging said beam of unpolarized light on a reflective polarizer means, so as to direct light rays having the first polarization along the first light path and to direct light rays having the second polarization along a second light path, reflecting the reflected light rays following the second light path, changing the orientation of the polarization of the light rays in both the first and the second light path.

The present invention furthermore comprises an LCD projector or an LCOS projector comprising any of the above optical polarization recuperation devices.

The present invention simplifies the optical set-up of a projector by implementing polarization recuperation inside a single lightpipe, without adding complexity to the shape thereof. The lightpipe can be made out of 4 side surfaces, an entrance and an exit interface, as conventional lightpipes. No restriction on the present invention is contemplated dependent upon the type of lightpipe used.

It is an advantage of the optical polarization recuperation system and method of the present invention that the efficiency of the projector is increased by using a polarization recuperation system, while preserving the compactness of the projector, and while avoiding the use of polarization recovery systems outside the lightpipe.

These and other features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
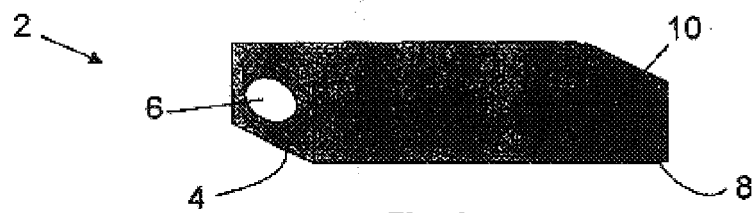
FIG. 1 is a perspective view of a lightpipe according to an embodiment of the present invention.

In the different figures, the same reference figures refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Spatial light modulators are known to the skilled person— see "Fundamentals of Photonics", B. E. A. Saleh and M. C. Teich, Wiley Series in Pure and Applied Optics, 1991. A spatial light modulator is a device which modulates the intensity of light at different positions by prescribed factors. Generally, it is a passive device and usually a planar optical element which can work in reflection or transmission. It has the function of controlling light intensity in reflection or transmission in accordance with a function of the position, i.e. F (x,y) of co-ordinates x, y in a Cartesian co-ordinate system. The intensity of the light at the output of the device is a function of the input might intensity 1 (x,y) and the modulation function F (x,y) namely, the output intensity O (x,y)=l (x,y). F (x,y). Generally, spatial light modulators can change the modulation function F (x,y) with time, i.e. they are controllable like a light valve for instance. Generally, for display purposes the input light is sensibly constant with time and the spatial light modulator modulates this light to project a still or moving picture, that is O (x,y,t)=l(x,y). F (x,y,t). Spatial light modulators may be electro-optical, but the present invention is not limited thereto, that is an electric signal is able to alter the function F (x,y,t) in time, e.g. the electric signal creates or induces an electric field or electric current which alters the property of a material or moves a mirror, for example.

One form of spatial modulator can be made from liquid crystals and is generally known as an LCD (Liquid Crystal display) or LCOS. The liquid crystal can be nematic, twisted nematic, ferroelectric or similar. The LCD electro-optical elements co-operate with polarized light to vary the light intensity in transmission or reflection form more or less completely blocked to a high intensity determined by the absorption properties of the polarizing filters used in the LCD.

Wave retarders, polarization rotators, polarizing filters and methods of creating and manipulating polarized light are known from the above mentioned book by B. E. A. Saleh and M. C. Teich.

According to a first embodiment of an optical polarization recuperation device of the present invention, an optical system is provided of which a lightpipe 2 is one example, as shown in FIG. 1. The lightpipe 2 can comprise four side surfaces that are made from or coated with reflective material at the inside. Other designs of lightpipe may be used and no restriction is contemplated on this invention by the type of lightpipe used. Lightpipe 2 also has an entrance side 4 made from or coated with reflective material at the inner side, with an aperture 6 in it for receiving incoming light rays, which are generally unpolarized. Lightpipe 2 furthermore has an exit area 8 for allowing light rays to exit the lightpipe 2. The light rays follow a first path between the aperture 6 and the exit area 8. At the exit area 8, a reflective polarizer means, such as e.g. a wiregrid polarizer 10 as described in WO 01/18570, is provided, for transmitting light rays having a first polarization direction, and for reflecting light rays which have the second polarization direction back into the lightpipe 2. In the cross-section of the lightpipe, a retarder means is provided.

Figure 2:
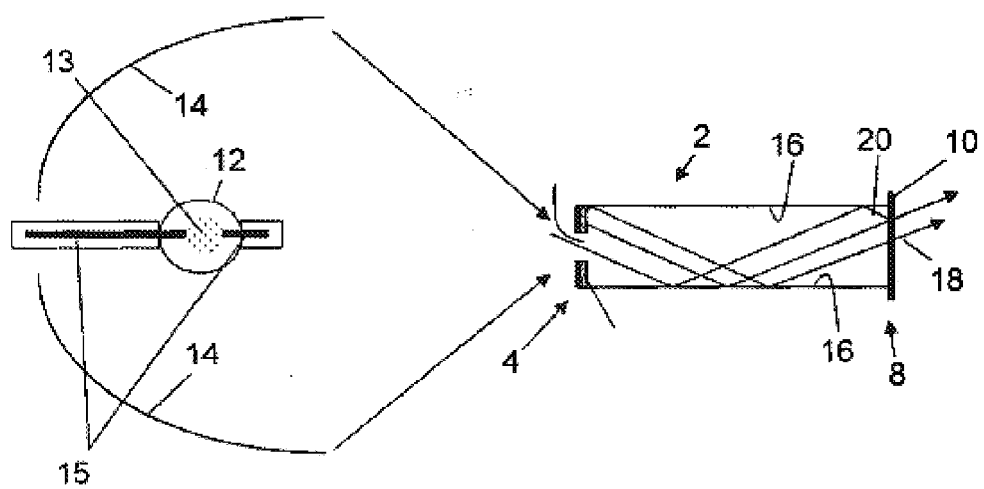
FIG. 2 is a vertical cross-section of a system comprising a lamp with reflector and a polarization recuperating lightpipe according to an embodiment of the present invention.

FIG. 2 is a cross-sectional view of the lightpipe 2 with polarization recuperation. The light from a light source such as a lamp 12, possibly reflected by reflector 14, enters the lightpipe 2 from the entrance side 4, more specifically through the aperture 6. The light enters the lightpipe 2 with different incident angles and through the complete entrance aperture 6. The light propagates through the lightpipe 2 and a lot of light rays are reflected one or more times on the reflective sides 16 of the lightpipe 2. This homogenises the spatial distribution of the light. At the end of the lightpipe 2, the light hits the reflective polarizer 10. This reflective polarizer 10 can be for instance a wiregrid polarizer. The polarizer 10 transmits the light 18 with a linear polarization direction corresponding to the priority direction thereof, and reflects the light 20 with a linear polarization direction perpendicular thereto. Some light, ideally very little, is absorbed in the polarizer. Such a very small absorption of the light is the case for wiregrid and PBS type polarizers, so little heating takes place, even with high illumination levels.

The light 18 transmitted through the reflective polarizer 10, with the correct polarization state so that it can be used for the LCD or LCOS devices in the projector follows a first optical path from the aperture 6 at the entrance side 4 to the exit area 8. The light that is reflected by the polarizer 10 has another, non-usable, polarization state and follows a second optical path which is described below. Sometimes, also some light of the right polarization is reflected back (up to maximum 10%).

The reflected light 20 propagates back to the entrance side 4 of the lightpipe 2, undergoing another number of reflections further equalising its spatial distribution throughout the cross section of the lightpipe 2. At the entrance side 4, the light can fall into the aperture 6 or outside the aperture 6 on the mirror 22 formed by the reflective material at the inner side of the entrance side 4. Light falling outside the aperture 6 reflects on the reflective inner surfaces 22 of the entrance side 4, which again changes the propagation direction towards the exit side 8 of the lightpipe 2. This light will be given a second chance to pass through the reflective polarizer 10. Light falling into the aperture 6 has also a good chance of coming back into the same entrance pupil. The entrance aperture 6 position and size matches the image of the light generation area between the electrodes of the lamp 12 made by the reflector 14 (plus possibly a number of lenses). The light from the aperture 6 is thus imaged by the same optical configuration in or near this area between the lamp electrodes, and has a good chance of passing through this area again. Because the optical system is designed to send the light coming out of the area between the electrodes into the lightpipe 2, a large part of the light coming from the aperture 6 and sent through the area between the electrodes, is sent back to the aperture 6 again and re-enters the lightpipe 2.

The light which is reflected by the entrance mirror 22 outside the aperture 6, and the light coming back from the area between the electrodes of the lamp 12, will propagate again to the exit side 8 of the lightpipe 2, where it is given a second chance to pass through the reflective polarizer 10.

The light travelling along this second optical path was reflected on the reflective polarizer in the first time and if the polarization state has not changed the same light will be reflected again on its arrival. In accordance with an aspect of the present invention the returning light has the useable polarization. To allow the light travelling along the second optical path to pass through, the two following solutions can be taken into account.

According to a first embodiment, depolarization of the light takes place, either unwanted or desired. The many reflections on the numerous reflective surfaces and the pass through the plasma 13 present between the electrodes 15 of the lamp 12 has an effect on the polarization state and depolarizes the light to some degree. This depolarization causes this light to have a polarization component along the priority axis to some extent and this component will get through the reflective polarizer 10. This means that a part of the light is allowed a second pass through the lightpipe 2 with the correct polarization state as desired for the LCD or LCOS devices in the projector, i.e. some light has been recuperated. With the normally used high efficiency reflective materials or coatings, this depolarization effect in the lightpipe 2 is rather low. The depolarization can be increased by adding depolarizing means in the second path, e.g. birefringent materials in the cross-section of the lightpipe or on any inner surface of the lightpipe. If the total retardation of the birefringent material is high, i.e. more than 3× the wavelength of the light, the polarization state will be almost random for every wavelength because of the many different angles with which the light goes through these retarders and depolarizers.

According to a second embodiment, a quarter-wave retarder or rotator means is used, or uneven multiples of a quarter-wave retarder means. The quarter-wave retarder means may be a quarter wave retarder 24 and is preferably substantially parallel to the general propagation direction of the light from the entrance side 4 towards the exit area 8. The fast axis or the slow axis of the quarter-wave retarder 24 is in this plane perpendicular to the propagation direction and is rotated 45 degrees with respect to the priority axis of the reflective polarizer 10. The purpose of the quarter-wave retarder 24 is to rotate the polarization state of the light travelling along the second optical path. This happens in two passes, one when the light is propagating from the exit side 8 back to the entrance side 4 of the lightpipe 2, and one pass is when the light is propagating back again from the entrance side 4 to the exit side 8. The result is a half wave retardation. This technique is very effective to rotate the polarization state of almost all of the light travelling along the second optical path over 90 degrees, and thus allow it to pass through the reflective polarizer the second time and therefore completely recuperate this otherwise lost light. In the set-up described, the contribution of depolarization effects should be avoided as much as possible because it only decreases the rotation efficiency of the quarter-wave retarder 24. It is also advisable to select a broadband quarter-wave retarder 24 to optimise the polarization recuperation for all the wavelengths in the visual spectrum.

Figure 3:
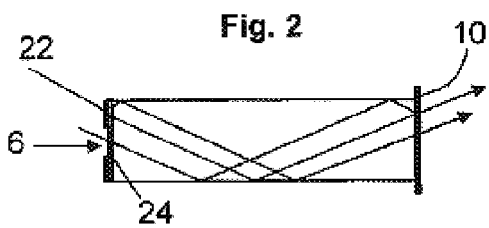
FIG. 3 is a vertical cross-section of a lightpipe according to an embodiment of the present invention, in which a quarter-wave retarder is positioned in the appropriate way at the entrance side of the lightpipe.
Figure 4:
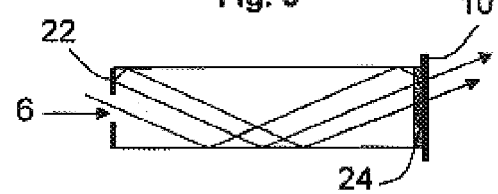
FIG. 4 is a vertical cross-section of a lightpipe according to an embodiment of the present invention, in which a quarter-wave retarder is positioned at the exit side of the lightpipe.
Figure 5:
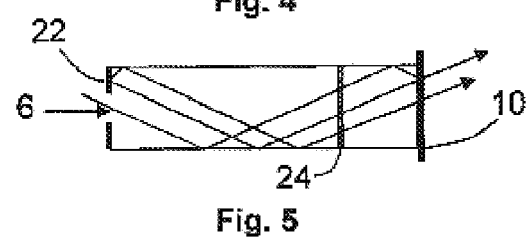
FIG. 5 is a vertical cross-section of a lightpipe according to an embodiment of the present invention, in which a quarter-wave retarder is positioned in a central part of the lightpipe.

FIG. 2 shows an embodiment where a quarter-wave retarder 24 is fixed to the entrance area 4 of the lightpipe 2 and has a hole in it. FIG. 3 shows another embodiment, in which a quarter-wave retarder 24 is fixed to the entrance area 4 of the lightpipe 2 but has no hole in it. FIG. 4 shows still another embodiment, where the quarter-wave retarder 24 is positioned at the exit side 8 of the lightpipe 2, just in front of the reflective polarizer 10. FIG. 5 shows the quarter-wave retarder 24 in the central area of the lightpipe 2. In yet another embodiment (not represented in the drawings), instead of a quarter-wave retarder, a distributed retarder is used, consisting of a plurality of retarders, for example two separate eighth-wave retarders, which co-operate to form a quarter wave retarder means.

The presence of the quarter-wave retarder 24 in the cross section of the lightpipe 2 has no substantial effect on the polarization state of the light that has entered the lightpipe 2 for the first time (and is thus following the first path) and did not reach the reflective polarizer 10 yet. This light is still substantially unpolarized, and therefore the contribution of light with a polarization state along and perpendicular to an axis of the reflective polarizer is substantially the same before and after the quarter-wave retarder 24.

A combination of the two techniques mentioned above (twice a quarter-wave retardation+depolarization of light) is also possible. For instance FIG. 2 shows an embodiment where the quarter-wave retarder 24 is fixed to the mirror 22 on the entrance side 4 of the lightpipe 2, but only on the reflective surface outside the aperture 6. In this embodiment one counts on the quarter-wave retarder 22 for the light that is reflected by the mirror 22, and counts on the depolarization effect for the light that is getting back out through the aperture 6 and re-enters the lightpipe 2 after having gone through the area between the electrodes of the lamp 12.

Light that still has the wrong polarization state in spite of the techniques used as explained hereinabove, is reflected once again by the reflective polarizer 10, and is allowed to travel along a third optical path, with again a good chance to be recaptured so that part of it will be presented again to the exit side 8 of the lightpipe 2, and so on.

Figure 6:
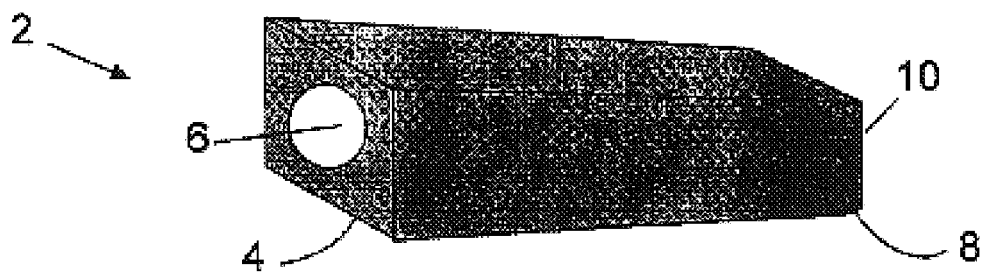
FIG. 6 is a perspective view of a tapered lightpipe according to an embodiment of the present invention.

The lightpipe 2 can have a constant cross-section as shown in FIG. 1, or it can be tapered, as shown in FIG. 6, as long as the tapering permits the light with the different incident angles to propagate from the entrance side to the exit side and vice-versa.

Figure 7:
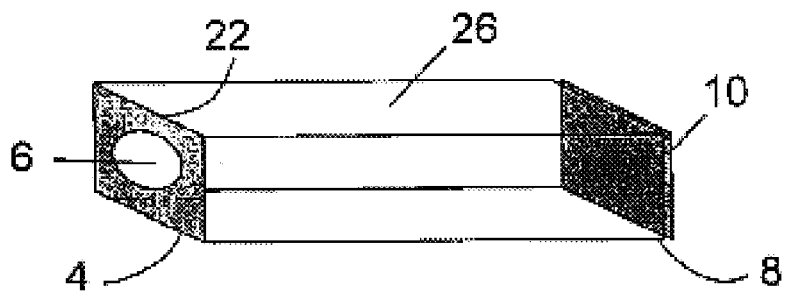
FIG. 7 is a perspective view of a solid glass lightpipe with a reflective polarizer at the exit side and a mirror with an aperture at the entrance side.

The lightpipe 2 can have mirroring inner sides, as described above, or it can be a solid glass rod 26, as shown in FIG. 7, where the reflections to the side surfaces are based on internal reflection of light with a large incident angle. The reflective polarizer 10 at the end can be positioned glued to the glass rod 26 or positioned very close to it. The mirror 22 with the aperture 6 can be glued to the entrance side 4 of the lightpipe 2 or positioned very close to it. The quarter-wave retarder 24, or any other retarder, can be sandwiched between the glass rod 26 and the mirror 22 at the entrance side 4 or between the glass rod 26 and the reflective polarizer 10 at the exit side 8.

The embodiments according to the present invention presented above provide an integrated solution of polarization recuperation as part of an optical circuit, e.g. using a lightpipe. This new optical component improves the efficiency, cost and compactness of optical systems using polarized light sources, e.g. optical systems using LCD or LCOS projectors that need to use polarized light incident on the LCD or LCOS devices.

Figure 8:
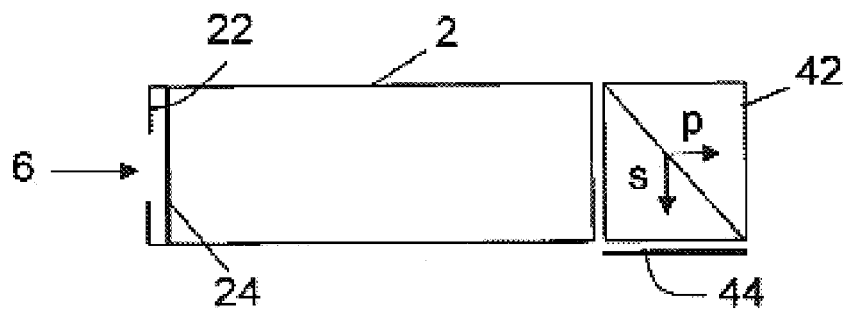
FIG. 8 is a schematic representation of a lightpipe with a PBS as reflecting polarizer means according to another embodiment of the present invention.

According to another embodiment of the present invention, as shown in FIG. 8, an optical system such as a lightpipe 2 may be provided with for example a quarter-wave retarder 24, e.g. at the entrance side 4 of the light pipe 2. At the exit side 8, a PBS 42 is provided, which allows light with a certain polarization direction, for example p, to exit, and which reflects light having another polarization direction, for example s. At that side of the PBS element 42 where the light having the s polarization direction would exit, a supplementary mirror 44 is provided. The light with polarization in the s-direction is reflected back into the PBS element 42 and back towards the entrance side of the lightpipe 2. Before reaching the entrance side 4 of the lightpipe 2, the light passes through the quarter-wave retarder 24, and when being reflected by the mirrors 22 or when re-entering the lightpipe 2 through aperture 6, the light goes through the quarter-wave retarder 24 once again. The light which previously had an s-polarization direction, now substantially has the p-polarization direction, and exits the PBS element 42. That way, the part of the light having s-polarization is recuperated and transformed into light having the p-polarization.

According to an embodiment of the present invention, the reflective polarizer 10 can also be a cholesteric liquid crystal polarizer, e.g. as known from U.S. Pat. No. 5,325,218. This polarizer transmits one type of circularly polarized light (left or right) dependent on the rotation direction of the cholesteric liquid crystal used. The polarizer reflects the circularly polarized light of the other type (respectively right or left). In this embodiment a quarter-wave retarder is not necessary in the second light path, as the light that is reflected on a mirror and is coming back to the cholesteric polarizer already has undergone a change of polarization state from left circularly to right circularly polarized or vice-versa caused by the reflection from the mirror. If the light reflected by the mirror was not or only slightly depolarized, it is transmitted by the cholesteric polarizer the second time. However, a quarter wave retarder means is still required in this embodiment. It is placed on the light exit side of the cholesteric polarizer to convert circular polarized light into linear polarized light.

Figure 9:
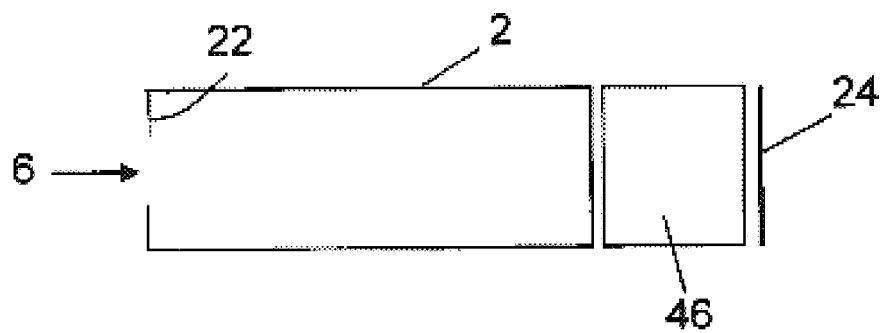
FIG. 9 is a schematic representation of a lightpipe with a cholesteric polarizer according to yet another embodiment of the present invention.

According to this embodiment of the present invention, as shown in FIG. 9, at the exit side of a lightpipe 2, a cholesteric polarizer 46 is provided. Light entering the lightpipe 2 through aperture 6 is preferably depolarized light comprising both left and right circularly polarized components. Either the left circular polarization or the right circular polarization of the light is allowed to pass through a cholesteric polarizer 46. Light passing through the cholesteric polarizer 46 then passes through a quarter wave retarder means 24 in order to convert the circularly polarized light into linearly polarized light. Light not passing through the cholesteric polarizer 46 is reflected back to the entrance side 4 of the lightpipe 2, where it is reflected by the mirror 22. By just reflecting the circularly polarized light, the circular polarization direction switches, so the light with this transformed polarization direction will be allowed to pass the cholesteric polarizer 46 and the retarder means 24.

Figure 10:
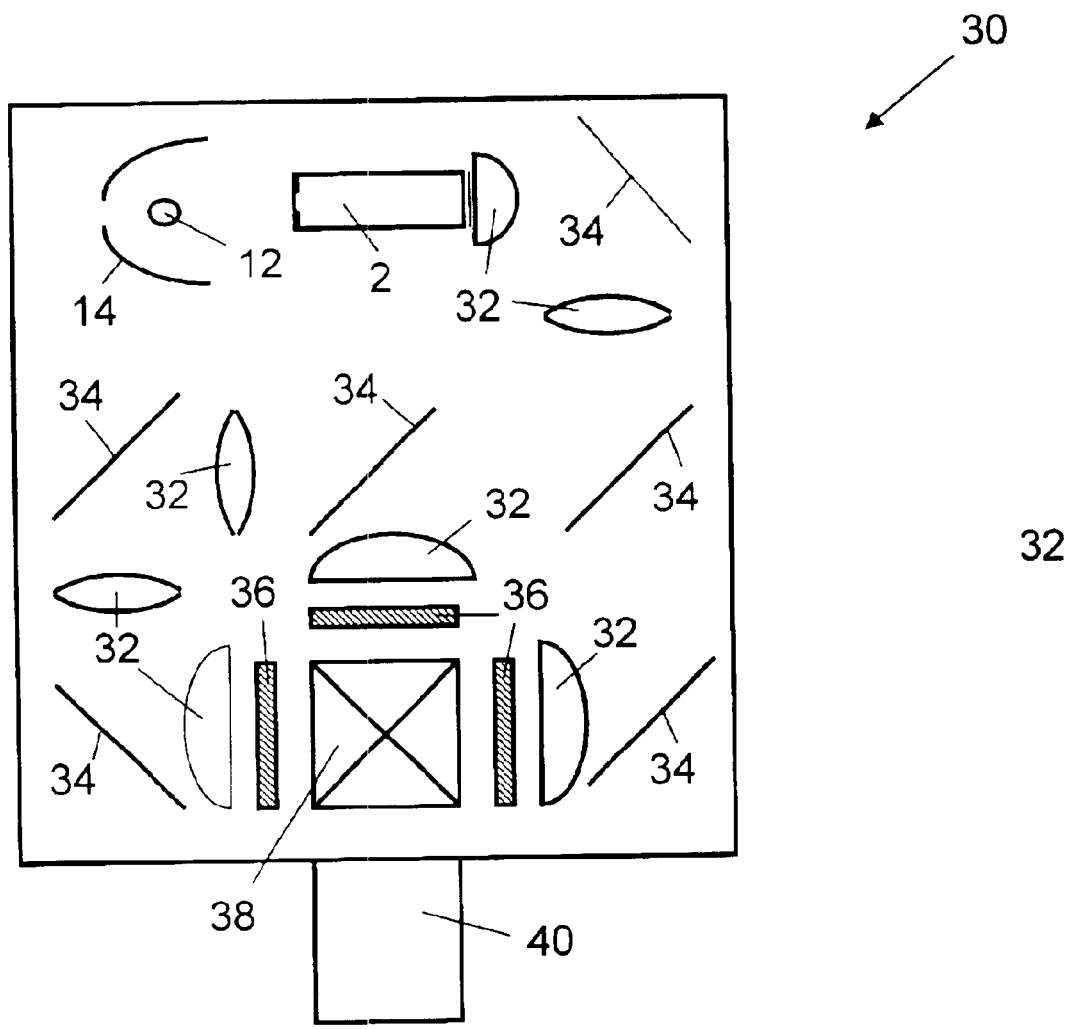
FIG. 10 is a schematic diagram of a projector with a lightpipe according to any embodiment of the present invention.

A lightpipe 2 according to the present invention may for example be used in a projection device 30 as schematically represented in FIG. 10. Light is generated by a lamp 12 and is sent into a lightpipe 2 according to the present invention by the use of a reflector 14 and possibly a set of one or more extra lenses (not represented). The light form the lamp 12 is homogenised inside the lightpipe 2 and according to the present invention it is polarized as well. The exit of the lightpipe 2, or a plane close to the exit of the lightpipe 2 is imaged by a set of lenses 31 and mirrors 34 onto one or more LCD or LCOS devices 36. In case of a one LCD or LCOS device 36 (not represented in the drawings), a sequential colour system is used to illuminate the whole or a part of the device with alternatively red, green and blue light. In case of a three LCD or LCOS projector, as in FIG. 10, the projector optical path includes a colour split-up and recombination system 34, 38, dividing the light into the three different primary colours each following a different optical path. Every colour channel includes an LCD or LCOS device 36. After the recombination of the colour information in recombination prism 38, the light gets through a projection lens 40 that images the information of the one or three LCD or LCOS devices 36 on a screen.

While the invention has been shown and described with reference to preferred embodiments, it will be understood by those skilled in the art that various changes or modifications in form and detail may be made without departing from the scope and spirit of this invention.

What is claimed is:

1. An optical polarization recuperation device for producing a substantially polarized light beam from an unpolarized light beam comprising first and second polarizations, the device comprising:

an optical circuit having an entrance area for receiving incoming light rays, and an exit area for allowing light rays to exit the optical circuit, the entrance area having an inner side with an aperture and the exit area having an outer side away from said entrance area, a reflective polarizer means adjacent the outer side of the exit area of the optical circuit, for directing light rays having the first polarization into a first light path and for directing light rays which have the second polarization into a second light path in the optical circuit, a mirror at the inner side of the entrance area of the optical circuit, with a means for reflecting those light rays following the second light path which fall onto it, and a quarter wave or an odd multiple of quarter wave retarder means through which at least a part of the light in the optical circuit and which is to be emitted from the optical circuit passes, wherein light following the first and the second light path goes through the same part of the optical circuit.

2. An optical polarization recuperation device according to claim 1, wherein the optical circuit is a lightpipe.

3. An optical polarization recuperation device according to claim 1, wherein the retarder means is provided in both the first and second light path.

4. An optical polarization recuperation device according to claim 1, wherein the retarder means is placed at the exit area of the optical circuit.

5. An optical polarization recuperation device according to claim 1, wherein the retarder means is placed at the entrance area of the optical circuit.

6. An optical polarization recuperation device according to claim 1, wherein the retarder means is a quarter wavelength retarder or an odd multiple of a quarter wave retarder or a number of retarders which co-operate together to form the quarter wave or odd multiple of a quarter wave retarder means.

7. An optical polarization recuperation device according to claim 6, wherein the retarder means is fanned from two eighth wavelength retarders.

8. An optical polarization recuperation device according to claim 1, wherein the retarder means is a broadband retarder.

9. An optical polarization recuperation device according to claim 1, wherein the reflective polarizer means is a polarizing beam splitter.

10. An optical polarization recuperation device according to claim 1, wherein the reflective polarizer means is a wiregrid polarizer.

11. An optical polarization recuperation device to claim 1, furthermore comprising a depolarizer means for depolarizing light.

12. An optical polarization recuperation device according to claim 11, the light rays being emitted from a light source having electrodes, wherein the depolarizer means comprises plasma between the electrodes of the light source.

13. An optical polarization recuperation device for producing a substantially polarized light beam from an unpolarized light beam comprising first and second polarizations, the device comprising:

an optical circuit having an entrance area for receiving incoming light rays, and an exit area for allowing light rays to exit the optical circuit, the entrance area having an inner side with an aperture and the exit area having an outer side away from said inner side, a reflective polarizer means at the exit area of the optical circuit, for directing light rays having the first polarization along a first light path and for directing into the optical circuit light rays which have the second polarization, the light rays having the second polarization following a second light path in the optical circuit, a mirror at the inner side of the entrance area of the optical circuit having means for reflecting those light rays following the second light path which fall onto it, and a depolarizer means for depolarizing light, the depolarizing means being at least in the second light path.

14. An optical polarization recuperation device according to claim 13, wherein the optical circuit is a light pipe.

15. An optical polarization recuperation device according to claim 14, wherein the depolarizer means comprises a birefringent material in the cross-section of the light pipe.

16. An optical polarization recuperation device according to claim 14, wherein the depolarizer means comprises a birefringent material on any inner surface of the lightpipe.

17. An optical polarization recuperation device according to claim 13, the light rays being emitted from a light source having electrodes, wherein the depolarizer means comprises a plasma between the electrodes of the light source.

18. An optical polarization recuperation device according to claim 11, wherein the depolarizer means are located anywhere in the second light path.

* * * * *